United States Patent
Billman et al.

(10) Patent No.: US 8,094,988 B2
(45) Date of Patent: Jan. 10, 2012

(54) APPARATUS AND METHODS FOR VERIFYING AN ACCEPTABLE SPLICE TERMINATION

(75) Inventors: Bradley S. Billman, Denton, TX (US); David W. Meek, Ft. Worth, TX (US); Joshua D. Raker, Lewisville, TX (US); Scott E. Semmler, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/304,313

(22) Filed: Dec. 15, 2005

(65) Prior Publication Data

US 2007/0274657 A1    Nov. 29, 2007

(51) Int. Cl.
*G02B 6/00* (2006.01)
*G02B 6/255* (2006.01)

(52) U.S. Cl. .............. 385/134; 385/95; 385/96; 385/97; 385/98; 385/99; 385/135; 385/139; 385/147

(58) Field of Classification Search ........... 385/53, 385/58, 70, 72, 73, 76–78, 95–99, 134, 135, 385/139, 147
See application file for complete search history.

(56) References Cited

U.S. PATENT DOCUMENTS

| | | | | |
|---|---|---|---|---|
| 4,030,809 A | 6/1977 | Onishi et al. | ................. | 350/96 C |
| 4,257,674 A | 3/1981 | Griffin et al. | .............. | 350/96.21 |
| 4,372,768 A | 2/1983 | Zucker et al. | ................... | 65/4.21 |
| 4,728,169 A | 3/1988 | Campbell et al. | .......... | 350/96.15 |
| 4,755,018 A | 7/1988 | Heng et al. | ................ | 350/96.21 |
| 4,877,303 A | 10/1989 | Caldwell et al. | ........... | 350/96.21 |
| 4,881,028 A * | 11/1989 | Bright | ............................ | 324/127 |
| 4,923,274 A | 5/1990 | Dean | ........................... | 350/96.21 |
| 4,964,688 A | 10/1990 | Caldwell et al. | .............. | 350/96.2 |
| 5,008,545 A * | 4/1991 | Anderson et al. | .......... | 250/358.1 |
| 5,040,867 A | 8/1991 | deJong et al. | .................... | 385/60 |
| 5,259,047 A | 11/1993 | Morrison et al. | ................ | 385/27 |

(Continued)

FOREIGN PATENT DOCUMENTS

EP    1136860    9/2001

OTHER PUBLICATIONS

Siecor® CAMLITE™ Multimode Connector Procedure for Laser Usage, SRP-006-046, CIRCA 1991, 2 pages.

(Continued)

*Primary Examiner* — Brian M. Healy
*Assistant Examiner* — Hung Lam

(57) ABSTRACT

Apparatus and methods for verifying an acceptable splice termination include propagating light energy into the stub optical fiber of a fiber optic connector, detecting and collecting the amount of optical power emanating from the stub optical fiber at a termination area of the connector, converting the optical power to an electrical signal proportional to the amount of collected optical power, and displaying the electrical signal on a feedback monitor, such as an optical power meter, an LCD bar graph, or an LED. An initial (i.e., reference) value is obtained with the field optical fiber not in physical contact with the stub optical fiber. A final (i.e., terminated) value is obtained with the field optical fiber in physical contact with the stub optical fiber and terminated to the connector. The final value is compared to the initial value to determine whether the change (i.e., difference) is sufficient. Alternatively, the final value is compared to a predetermined limit or threshold.

16 Claims, 6 Drawing Sheets

U.S. PATENT DOCUMENTS

| | | | |
|---|---|---|---|
| 5,261,020 A | 11/1993 | deJong et al. | 385/76 |
| 5,278,932 A * | 1/1994 | DeVeau et al. | 385/134 |
| 5,315,365 A | 5/1994 | Hakimi et al. | 356/73.1 |
| 5,367,594 A * | 11/1994 | Essert et al. | 385/70 |
| 5,394,496 A | 2/1995 | Caldwell et al. | 385/70 |
| 5,963,692 A | 10/1999 | Marazzi et al. | 385/80 |
| 6,173,097 B1 | 1/2001 | Throckmorton et al. | 385/59 |
| 6,379,054 B2 | 4/2002 | Throckmorton et al. | 385/66 |
| 6,439,780 B1 | 8/2002 | Mudd et al. | 385/83 |
| 6,442,318 B1 | 8/2002 | Goldman | 385/114 |
| 6,816,661 B1 | 11/2004 | Barnes et al. | 385/134 |
| 6,931,193 B2 | 8/2005 | Barnes et al. | 385/134 |
| 7,181,111 B2 * | 2/2007 | Ahrens | 385/52 |
| 2003/0086657 A1 | 5/2003 | Viklund | 385/55 |
| 2005/0238292 A1 | 10/2005 | Barnes et al. | 385/78 |
| 2007/0025681 A1* | 2/2007 | Turner | 385/147 |
| 2007/0104445 A1* | 5/2007 | Larson et al. | 385/134 |

OTHER PUBLICATIONS

Siecor® CAMLITE™ Connector Laser Assembly Aid Instructions, SRP-006-048, Issue 3, Sep. 1991, 6 pages.

* cited by examiner

APPARATUS AND METHODS FOR VERIFYING AN ACCEPTABLE SPLICE TERMINATION

BACKGROUND OF THE INVENTION

1. Field of the Invention

The present invention relates generally to apparatus and methods for determining whether the continuity of the optical coupling between optical fibers is acceptable, and more particularly, to apparatus and methods for verifying an acceptable splice termination between a field optical fiber and a stub optical fiber in a fiber optic splice connector.

2. Technical Background

Optical fibers are useful in a wide variety of applications, including the telecommunications industry in which optical fibers are employed for voice, data and video transmission. Due, at least in part, to the extremely wide bandwidth and the low noise operation provided by optical fibers, the variety of applications in which optical fibers are being used is continuing to increase. For example, optical fibers no longer serve merely as a medium for long distance signal transmission, but are being increasingly routed directly to the home, and in some instances, directly to a desk or other work location. With the ever increasing and varied use of optical fibers, apparatus and methods have been developed for coupling optical fibers to one another outside the controlled environment of a factory setting, commonly referred to as "field installation" or "in the field," such as in a telephone central office, in an office building, and in various types of outside plant terminals. However, in order to efficiently couple the optical signals transmitted by the fibers, a fiber optic connector must not significantly attenuate, reflect or otherwise alter the optical signals. In addition, fiber optic connectors for coupling optical fibers must be relatively rugged and adapted to be connected and disconnected a number of times in order to accommodate changes in the optical transmission path that may occur over time.

Although fiber optic connectors can generally be most efficiently and reliably mounted upon the end portion of an optical fiber in a factory setting during the production of a fiber optic cable assembly, many fiber optic connectors must be mounted upon the end portion of an optical fiber in the field in order to minimize cable lengths and to optimize cable management and routing. As such, a number of fiber optic connectors have been developed specifically to facilitate field installation. One advantageous type of fiber optic connector that is designed specifically to facilitate field installation is the UNICAM® family of field-installable fiber optic connectors available from Corning Cable Systems LLC of Hickory, N.C. Although the UNICAM® family of field-installable connectors includes a number of common features including a common termination technique (i.e., mechanical splice), the UNICAM® family also offers several different styles of connectors, including mechanical splice connectors adapted to be mounted upon a single optical fiber and mechanical splice connectors adapted to be mounted upon two or more optical fibers. Regardless, each such field-installable fiber optic connector requires a method of determining whether the continuity of the optical coupling between the fiber optic connector and a field optical fiber mounted upon the fiber optic connector is acceptable. As used herein, this process is generally referred to as "verifying an acceptable splice termination." Typically, a splice termination is acceptable when a variable related to the optical performance of the connector, such as insertion loss or reflectance, is within a prescribed limit or threshold value. In a particular example, the splice termination is acceptable when the insertion loss of the connector as indicated by an optical power meter or Optical Time Domain Reflectometer (OTDR) is less than a predetermined value.

A conventional field-installable fiber optic connector 10 is illustrated in FIGS. 1A and 1B. By way of example, the fiber optic connector 10 shown in FIGS. 1A and 1B is a field-installable SC style UNICAM® mechanical splice connector developed by Corning Cable Systems LLC. However, the apparatus and methods described herein are applicable to verifying the continuity of the optical coupling between any pair of interconnected optical fibers, and more particularly, between a field optical fiber and an optical fiber of any fiber optic splice connector, including a single fiber or multifiber fusion splice or mechanical splice connector. Examples of typical single fiber mechanical splice connectors are provided in U.S. Pat. Nos. 4,755,018; 4,923,274; 5,040,867; and 5,394,496. Examples of typical multifiber mechanical splice connectors are provided in U.S. Pat. Nos. 6,173,097; 6,379,054; 6,439,780; and 6,816,661. As shown herein, the mechanical splice connector 10 includes a ferrule 12 defining a lengthwise, longitudinal bore for receiving a stub optical fiber 14. The stub optical fiber 14 is preferably sized such that one end extends outwardly beyond the rear end 13 of the ferrule 12. The mechanical splice connector 10 also includes a pair of opposed splice components 17, 18, at least one of which defines a lengthwise, longitudinal groove for receiving and aligning the end portion of the stub optical fiber 14 and an end portion of a field optical fiber 15 upon which the mechanical splice connector 10 is to be mounted.

In order to mount the connector 10 upon the field optical fiber 15, the splice components 17, 18 are positioned proximate the rear end 13 of the ferrule 12 such that the end portion of the stub optical fiber 14 extending rearwardly from the ferrule is disposed within the groove defined by the splice components. Thereafter, the end portion of the field optical fiber 15 can be inserted into the groove defined by the splice components 17, 18. By advancing the field optical fiber 15 into the groove defined by the splice components 17, 18, the end portions of the stub optical fiber 14 and the field optical fiber 15 make physical contact and establish an optical connection, or coupling, between the field optical fiber and the stub optical fiber. The splice termination of the fiber optic connector 10 is completed as illustrated in FIG. 1B by actuating a cam member 20 to bias the splice components 17, 18 together, and thereby secure the end portions of the stub optical fiber 14 and the field optical fiber 15 within the groove defined by the splice components. If the continuity of the optical coupling between the field optical fiber 15 and the stub optical fiber 14 is acceptable (e.g., the insertion loss is less than a prescribed value and/or the reflectance is greater than a prescribed value), the cable assembly can be completed, for example by strain relieving the buffer 25 of the field optical fiber to the splice connector 10 in a known manner.

Installation tools have also been developed to facilitate the splice termination of one or more optical fibers to a fiber optic connector, and particularly, to enable the splice termination of one or more field optical fiber to a mechanical splice connector. Examples of typical installation tools for facilitating the connectorization of one or more optical fibers to a mechanical splice connector in the field are described in U.S. Pat. Nos. 5,040,867; 5,261,020; 6,816,661; and 6,931,193. In particular, U.S. Pat. Nos. 6,816,661 and 6,931,193 describe a UNICAM® installation tool available from Corning Cable Systems LLC of Hickory, N.C. designed specifically to facilitate mounting the UNICAM® family of fiber optic connectors upon the end portions of one or more field optical fibers. Such an installation tool 30 for mounting one or more field optical fibers 15 onto a single fiber or multifiber field-installable fiber optic connector 10 is shown in FIG. 2. In general, the installation tool 30 supports the mechanical splice connector 10, including the ferrule 12 and the splice components 17, 18, while the field optical fiber 15 is inserted into the connector and aligned with the stub optical fiber 14. In this regard, the installation tool 30 includes a tool base 32, a tool housing 34 positioned on the tool base, and an adapter 35 provided on the tool housing. The adapter 35 has a first end for engaging the mechanical splice connector 10 that is to be mounted upon the field optical fiber 15, and an opposed second end that serves as a temporary dust cap. The forward end of the mechanical splice connector 10 is received within the first end of the adapter 35, which in turn is positioned on the tool housing 34. The end portion of the field optical fiber 15 is then inserted and advanced into the open rear end of the mechanical splice connector 10 and the splice components 17, 18 are subsequently actuated, for example biased together by engagement of the cam member 20 with at least one of the splice components, in order to secure the stub optical fiber 14 and the field optical fiber 15 between the splice components. In the particular examples shown herein, the cam member 20 is actuated by rotating the cam actuator arm 36 provided on the tool housing 34 about ninety degrees (90°) around the longitudinal axis of the installation tool 30 and the mechanical splice connector 10 (i.e., compare the positions of the cam actuator arm 36 in FIG. 3A and FIG. 3B).

Once the fiber optic connector 10 is mounted upon the end portion of the field optical fiber 15, the resulting fiber optic cable assembly is typically tested end-to-end. Among other things, testing is conducted to determine whether the optical continuity established between the stub optical fiber 14 and the field optical fiber 15 is acceptable. While optical connections and fiber optic cables can be tested in many different manners, a widely accepted test involves the introduction of light having a predetermined intensity and/or wavelength into one of the stub optical fiber 14 or the field optical fiber 15. By measuring the light propagation through the fiber optic connector 10, and more particularly, by measuring the insertion loss and/or reflectance using an optical power meter or OTDR, the continuity of the optical coupling between the stub optical fiber 14 and the field optical fiber 15 can be determined. If testing indicates that the optical fibers are not sufficiently coupled (for example the end portion of the field optical fiber 15 and the end portion of the stub optical fiber 14 are not in physical contact or are not aligned) the operator must either scrap the entire fiber optic cable assembly or, more commonly, replace the fiber optic connector 10 in an attempt to establish the desired optical continuity. In order to replace the fiber optic connector 10, the operator typically removes (i.e., cuts) the fiber optic connector off the field optical fiber 15 and repeats the mechanical splice termination process described above utilizing a new mechanical splice connector on the installation tool 30 and mounting the new mechanical splice connector onto the end portion of the field optical fiber. Field-installable mechanical splice connectors have recently been developed that permit the splice termination to be reversed, and thereby avoid the need to scrap the entire fiber optic cable assembly or the fiber optic connector. Regardless, significant time and expense is still required to mount the fiber optic connector onto the field optical fiber, remove the cable assembly from the installation tool, conduct the continuity test and, in the event of an unacceptable splice termination, repeat the entire process.

In order to facilitate relatively simple, rapid and inexpensive continuity testing, Corning Cable Systems LLC of Hickory, N.C. has developed installation tools for field-installable mechanical splice connectors that permit continuity testing while the connector remains mounted on the installation tool. As previously described, the installation tool 30 includes an adapter 35 having opposed first and second ends, the first end of which is adapted to receive the mechanical splice connector 10. In order to test the continuity of the optical coupling between the field optical fiber 15 and the stub optical fiber 14, an optical power generator, such as a Helium-Neon (HeNe) gas laser 40, is provided to deliver a visible wavelength (e.g., red) laser light to the area within the fiber optic connector 10 where the end portion of the field optical fiber meets the end portion of the stub optical fiber, referred to herein as the "termination area." In a particular embodiment, the visible light is delivered through the stub optical fiber 14 to the termination area via a test optical fiber 42 mounted upon a mating test connector 44 received within the second end of the adapter 35. As a result, the termination area is illuminated with visible light that produces a "glow" indicative of the amount of light from the stub optical fiber 14 being coupled into the field optical fiber 15. At least a portion of the connector 10 is formed of a transparent or non-opaque (e.g., translucent) material, for example the splice components 17, 18 and/or the cam member 20, so that the glow at the termination area is visible to the operator.

By monitoring the dissipation of the glow emanating from the termination area (i.e., from the stub optical fiber 14) before and after the field optical fiber 15 is inserted into the fiber optic connector 10 and terminated, the operator can determine whether there is sufficient physical contact and/or alignment between the field optical fiber 15 and the stub optical fiber. In particular, continuity of the optical coupling between the field optical fiber 15 and the stub optical fiber 14 is presumed to be established if the initial glow dissipates below a threshold amount. In instances when the splice termination is unacceptable (i.e., the initial glow emanating from the termination area does not dissipate below the threshold amount), the field optical fiber 15 may be repositioned relative to the stub optical fiber 14 and terminated again to the fiber optic connector 10 until the splice termination is acceptable. As previously mentioned, the installation tool 30 may be configured to permit the cam member 20 to be un-actuated (i.e., reversed) in the event that the splice termination is unacceptable (i.e., the glow emanating from the termination area is greater than the threshold amount), thereby releasing the splice components 17, 18, so that the field optical fiber 15 can be repositioned relative to the stub optical fiber 14 and again terminated to the fiber optic connector 10. However, the operator should not attempt to cause the glow to dissipate prior to actuating the cam member 20 by moving the field optical fiber 15 around inside the connector 10 in an attempt to cause the glow to diminish prior to actuating the cam member. Moving the field optical fiber 15 can cause damage to the end portions of the field optical fiber and the stub optical fiber 14, and in particular to the fiber cleaves. The field optical fiber 15 should be inserted into the splice connector 10 and advanced until it makes physical contact with the stub optical fiber 14. When physical contact is made, the operator typically will see a flicker in the glow. When the cam member 20 is actuated, the glow should diminish significantly.

The Corning Cable Systems LLC method for verifying an acceptable splice termination described above is commonly referred to as the "Continuity Test System" (CTS) and the combined functionality of the visible light laser 40, test optical fiber 42 and test connector 44 are commonly referred to as a "Visual Fault Locator" (VFL). In practice the method is generally sufficient for determining whether the majority of splice terminations are acceptable since the quality of the splice need not be maintained to a high degree of precision and the operator is typically highly-trained and experienced. However, in certain circumstances, for example when a fiber optic network requires an exceptionally low insertion loss, it is important to maintain the quality of the splice termination to a greater degree of precision. At the same time, it is desirable to utilize less highly-trained and experienced operators in order to reduce the overall cost of installing a fiber optic network. In such situations, a potential shortcoming of the above-described CTS method using a VFL is the variability of the amount of glow emanating from the termination area before and after the field optical fiber 15 is terminated to the splice connector 10. In particular, it may be difficult even for a highly-trained and experienced operator to assess whether the change in the amount of glow emanating from the termination area is substantial enough to indicate an acceptable splice termination. Variations in the ambient light, variations in the translucence of different fiber optic connectors, the operating condition of the VFL and the adapter, the subjectivity of the operator, and the variability introduced by different operators conducting the same test for different splice terminations are just some of the factors that contribute to the varying and inconsistent results that may be obtained when conducting continuity testing using a VFL.

Furthermore, depending upon the translucence of the fiber optic connector and the intensity of the visible laser light, the termination area may continue to glow appreciably (sometimes termed "nuisance glow") even after an acceptable splice termination. As a result, a less highly-trained and experienced operator may attempt multiple insertions of the field optical fiber and/or splice terminations using the same fiber optic connector in an effort to further diminish or entirely eliminate the nuisance glow in an acceptable splice termination. These misguided efforts of the untrained or inexperienced operator typically cause damage to the fiber optic connector or to the field optical fiber, or result in optical performance that is less than that which would have been achieved had the operator accepted the first termination, even though the glow was not completely diminished and the nuisance glow persisted. Contrary to common understanding, it is the difference in the visible amount of glow emanating from the termination area before and after the field optical fiber is terminated rather than the residual amount of glow that is most critical in determining whether a particular splice termination is acceptable. Accordingly, improved apparatus and methods are needed to reduce the overall time and cost required to obtain an acceptable splice termination. Improved apparatus and methods are also needed to eliminate the subjectivity presently introduced by an operator when verifying an acceptable splice termination in a field-installable fiber optic connector, and to thereby correspondingly increase the accuracy of determining whether a particular splice termination is acceptable. Preferably, such apparatus and methods should accommodate existing installation tools for field-installable fiber optic connectors, and more preferably, existing installation tools for single fiber and multifiber field-installable mechanical splice connectors.

Additional features and advantages of the invention are set forth in the detailed description which follows and will be readily apparent to those skilled in the art from that description, or will be readily recognized by practicing the invention as described in the detailed description, the drawings and the appended claims. It is to be understood that both the foregoing general description and the following detailed description present exemplary embodiments of the invention as well as certain preferred embodiments. As such, the detailed description is intended to provide an overview or framework for understanding the nature and character of the invention as recited in the appended claims. The accompanying drawings are included to provide a further understanding of the invention, and are incorporated into and constitute a part of this specification. The drawings illustrate various preferred embodiments of the invention, and together with the detailed description, serve to explain the principles and operations thereof. Additionally, the drawings and descriptions are meant to be merely illustrative, and are not intended to limit the scope of the claims in any manner.

DETAILED DESCRIPTION OF THE PREFERRED EMBODIMENTS

Figure 1A:
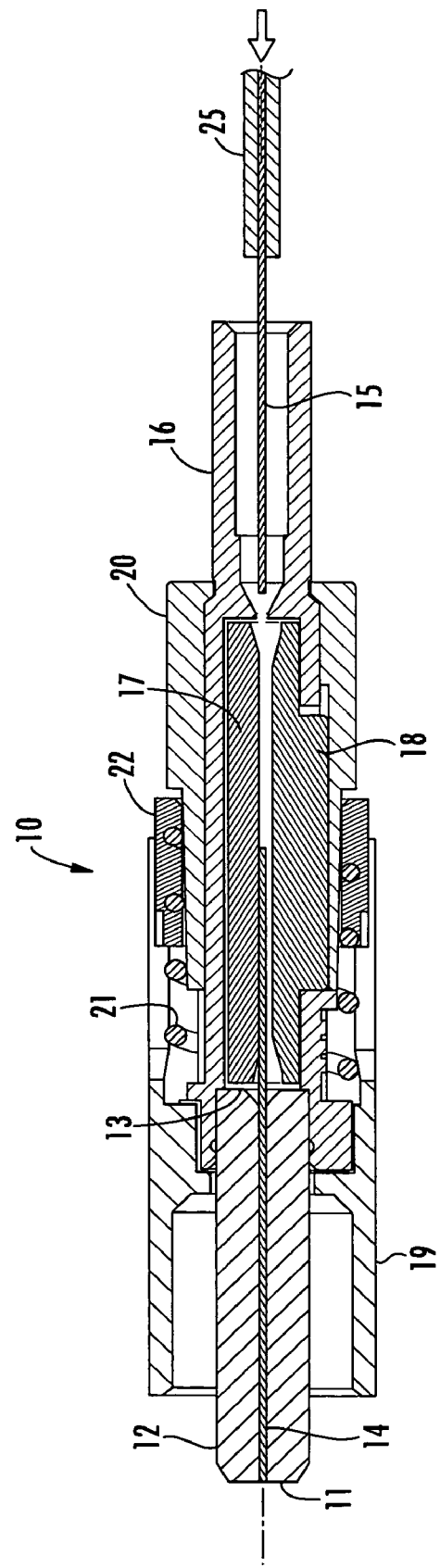
FIG. 1A is a lengthwise cross-sectional view of a conventional field-installable mechanical splice connector to be mounted on an end portion of a field optical fiber, the splice connector comprising a ferrule, a stub optical fiber extending rearwardly from the ferrule, a pair of opposed splice components for receiving and aligning the end portions of the stub optical fiber and the field optical fiber and a cam member for engaging the splice components, shown with the cam member in the un-actuated position.

Reference will now be made in greater detail to various exemplary embodiments of the invention, preferred embodiments of which are illustrated in the accompanying drawings. Whenever possible, the same reference numerals will be used throughout the drawings to refer to the same or similar parts. A single fiber field-installable mechanical splice connector operable for terminating a field optical fiber to the connector is shown herein for use with the various embodiments of the invention merely for purposes of convenience. It should be understood, however, that the apparatus and methods for verifying an acceptable splice termination disclosed herein may be applied to any optical coupling between any number of optical fibers, such as, but not limited to, any splice termination between adjoining optical fibers wherein light energy can be transmitted along at least one of the optical fibers and the light energy can be detected, collected and measured in the immediate vicinity of the splice joint. Accordingly, the invention should not be construed as being limited in any manner by the example of a single fiber field-installable mechanical splice connector shown and described herein.

Referring now once again to FIGS. 1A and 1B, a lengthwise cross-sectional view of a conventional single fiber field-installable mechanical splice connector 10 is shown. The mechanical splice connector 10 comprises a ferrule 12 defining a lengthwise bore therethrough for receiving and securing a stub optical fiber 14 in a known manner, such as by an adhesive. The forward end (also referred to herein as the end face) 11 of the ferrule is typically precision polished such that the stub optical fiber 14 is flush with (as shown) or slightly protruding from the end face of the ferrule. However, the stub optical fiber 14 may also protrude outwardly from the end face 11 of the ferrule 12 a predetermined distance, if desired. Furthermore, the end face 11 may be oriented generally perpendicular to the bore to provide an Ultra Physical Contact (UPC) type connector, or may be formed at a predetermined angle to provide an Angled Physical Contact (APC) type connector, in a know manner. In addition, although a single fiber ferrule 12 is shown for purposes of convenience, the ferrule may define a plurality of lengthwise bores therethrough for receiving a corresponding plurality of stub optical fibers to provide a multifiber mechanical splice connector. Regardless, the rear end 13 of the ferrule 12 is inserted into and secured within the forward end of a ferrule holder 16 so that the stub optical fiber 14 extends rearwardly a predetermined distance from the ferrule between a pair of opposed splice components 17, 18 disposed within the ferrule holder. In turn, the ferrule holder 16, including the ferrule 12 and splice components 17, 18, is disposed within a connector housing 19. A cam member 20 is movably mounted between the ferrule holder 16 and the connector housing 19 for engaging a keel portion of the lower splice component 18, as will be described. If desired, the ferrule 12, the ferrule holder 16 and the cam member 20 may be biased relative to the connector housing 19, for example by a coil spring 21, to ensure physical contact between the end face 11 of the ferrule 12 and the end face of an opposing ferrule in a mating fiber optic connector or optical device. Finally, a spring retainer 22 may be disposed between the connector housing 19 and a medial portion of the cam member 20 and fixed to the connector housing so as to retain one end of the spring 21 relative to the connector housing. As a result, the ferrule 12, the ferrule holder 16 and the cam member 20 are biased forwardly, yet permitted to piston rearwardly relative to the connector housing 19.

Figure 1B:
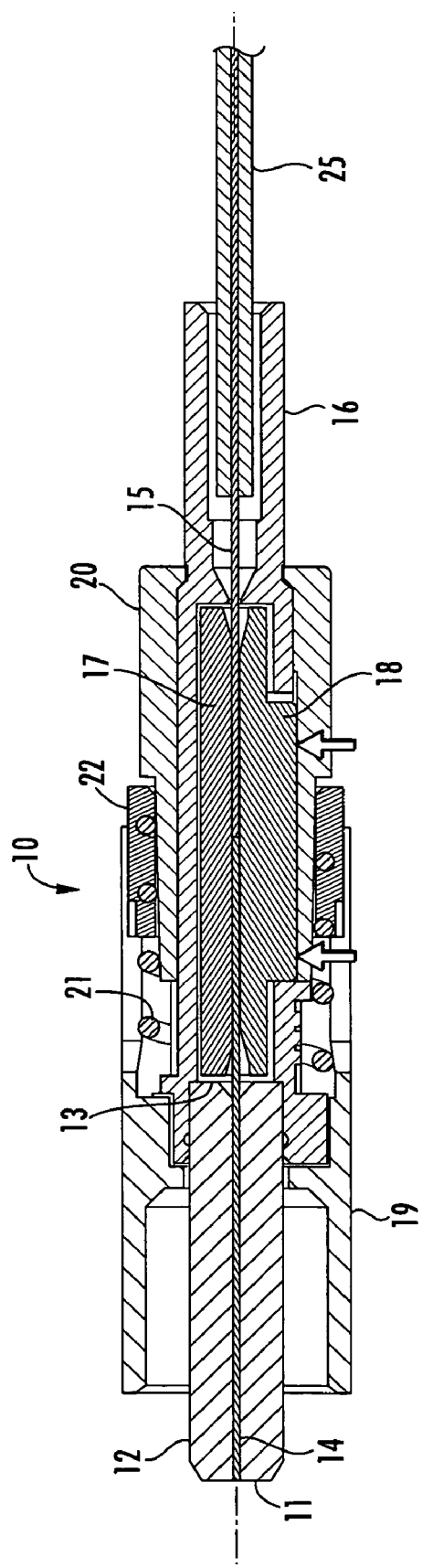
FIG. 1B is a lengthwise cross-sectional view of the mechanical splice connector and the field optical fiber of FIG. 1A, shown with the end portions of the stub optical fiber and the field optical fiber positioned within the splice components and the cam member in the actuated position to secure the respective end portions between the splice components.

As illustrated by the horizontal directional arrow in FIG. 1A, a field optical fiber 15 is inserted into the rear end of the ferrule holder 16 opposite the ferrule 12 and the stub optical fiber 14. Although not required, the mechanical splice connector 10 may be provided with a means, for example a lead-in tube (not shown), for guiding the field optical fiber 15 into the ferrule holder 16 and between the splice components 17, 18 in general alignment with the stub optical fiber 14. Preferably, at least one of the splice components 17, 18 has a groove formed therein for receiving the stub optical fiber 14 and the field optical fiber 15. As shown herein, the upper splice component 17 is provided with a lengthwise V-shaped groove for receiving and guiding the stub optical fiber 14 and the field optical fiber 15 into fine alignment. Typically, the field optical fiber 15 is coated or tight-buffered with a buffer 25 that is stripped back to expose a predetermined length of the end of the field optical fiber. The mechanical splice connector 10 may be further provided with a crimp tube or other strain relief mechanism (not shown) for retaining and strain relieving the buffer 25 of the field optical fiber 15. With the buffer 25 removed, the field optical fiber 15 can be inserted and advanced into the rear of the mechanical splice connector 10 between the splice components 17, 18 until the end portion of the field optical fiber makes physical contact with the end portion of the stub optical fiber 14. The cam member 20 can then be actuated, for example by rotating the cam member relative to the ferrule holder 16 about the longitudinal axis of the connector 10, to engage the keel on the splice component 18 and thereby force the lower splice component 18 in the direction of the upper splice component 17, as illustrated by the vertical directional arrows in FIG. 1B. Movement of the lower splice component 18 causes the end portion of the stub optical fiber 14 and the end portion of the field optical fiber 15 to seat within the V-shaped groove formed in the upper splice component 17, thereby aligning and simultaneously securing the field optical fiber 15 relative to the stub optical fiber 14 between the splice components.

Figure 2:
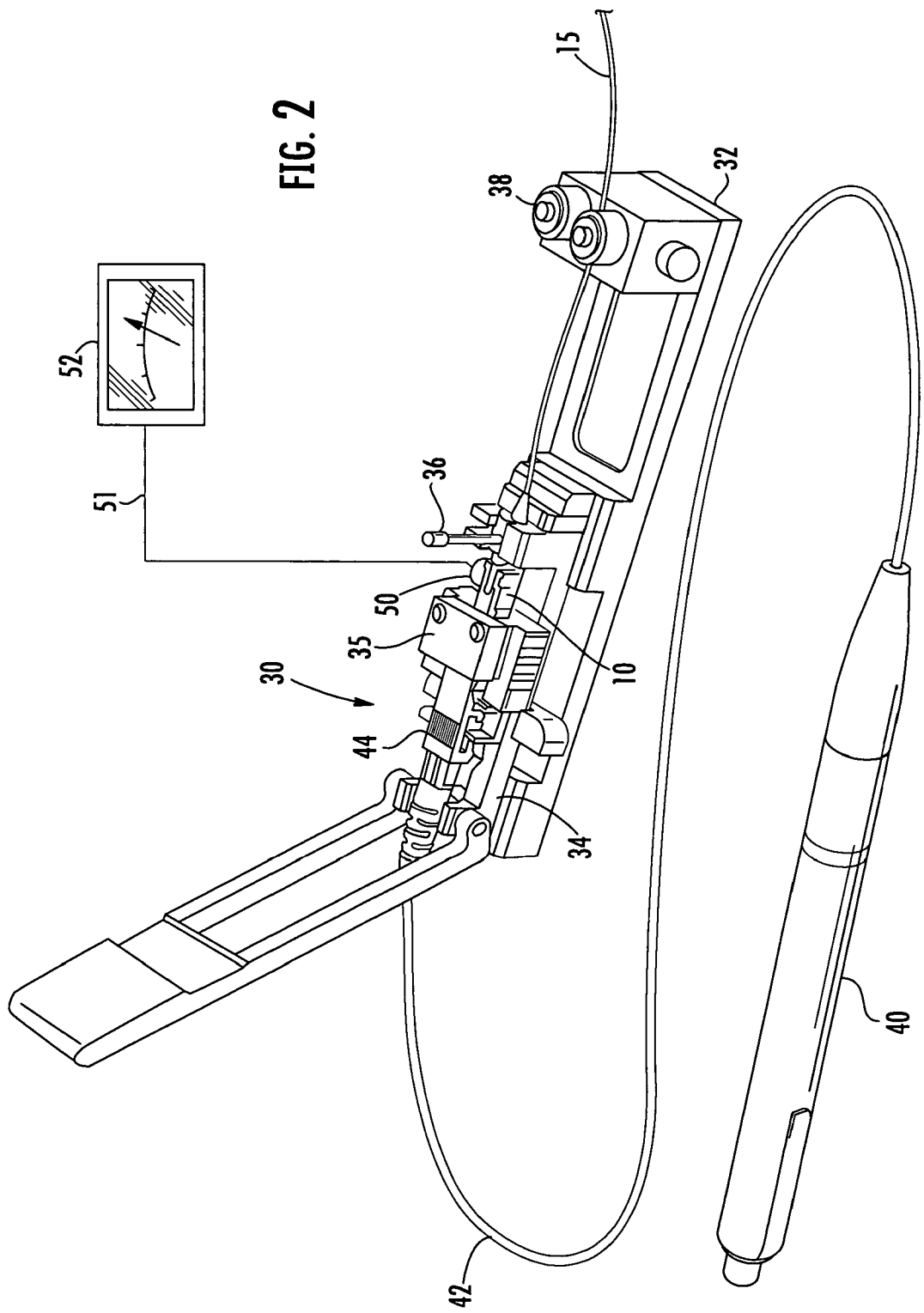
FIG. 2 is an environmental perspective view of an installation tool for a field-installable mechanical splice connector operable for terminating a field optical fiber to the stub optical fiber of a mechanical splice connector and for verifying an acceptable splice termination in accordance with a preferred apparatus and method of the invention.

In the event that the field optical fiber 15 is not in physical contact or is not properly aligned with the stub optical fiber 14, significant attenuation and/or reflectance of the optical signal transmitted along the optical fibers may occur. A slight amount of attenuation and/or reflectance is inevitable at any optical coupling due to the fact that the cores of the optical fibers are not truly concentric and the joint between the optical fibers cannot be formed with the same precision as a continuous optical fiber. Accordingly, the continuity of the optical coupling between the field optical fiber 15 and the stub optical fiber 14 is acceptable when a variable related to the optical performance of the connector, such as insertion loss or reflectance, is within a prescribed limit or threshold value. In a particular example, the continuity of the optical coupling is sufficient, and therefore the splice termination is acceptable, when the insertion loss at the mechanical splice is less than a prescribed value and/or the reflectance at the mechanical splice is greater than a prescribed value. As previously described, an indication of the insertion loss at the mechanical splice joint can be observed using the Continuity Test System (CTS) developed by Corning Cable Systems LLC including an optical power generator or radiant energy source incorporated into a Visual Fault Locator (VFL) comprising, for example, a Helium-Neon (HeNe) gas laser that propagates light energy having known characteristics, such as intensity and wavelength. FIG. 2 shows an installation tool 30 for a field-installable fiber optic connector, such as mechanical splice connector 10, arranged in combination with a VFL 40 for electronically gauging the insertion loss of the fiber optic connector 10 at the mechanical splice joint. The location of the mechanical splice joint corresponds to the area within the fiber optic connector 10 where the end portion of the field optical fiber 15 meets the end portion of the stub optical fiber 14, and is also referred to herein as the "termination area."

In the exemplary embodiment shown in FIG. 2, the VFL 40 delivers light energy through a test optical fiber 42 and the stub optical fiber 14 to the termination area via a mating test connector 44 mounted upon the test optical fiber and received within the second end of an adapter 35. The VFL 40 launches light energy into at least one of the adjoining optical fibers of the mechanical splice (i.e., the stub optical fiber 14 in the preferred embodiments shown herein), thereby causing the mechanical splice joint to "glow" so that the amount of optical power emanating from the termination area can be detected and collected, and subsequently displayed to an operator. In particular, the VFL 40 generates an optical signal (e.g., a laser light) and transmits the optical signal through a relatively short test optical fiber 42 optically coupled to the VFL 40 and factory-terminated with a precision polished test connector 44. The polished end face of the test connector 44 is optically coupled to the polished end face of the mechanical splice connector 10 via the adapter 35. With the end portion of the field optical fiber 15 spaced apart from the end portion of the stub optical fiber 14, the light energy introduced into the stub optical fiber generates an enhanced glow that emanates from the end of the stub optical fiber within the splice components 17, 18. The intensity of the glow diminishes when the end portion of the field optical fiber 15 is in physical contact and optically coupled with the end portion of the stub optical fiber 14, either through direct physical contact or via an index matching gel disposed within the opening defined by the splice components 17, 18, because the majority of the light energy transmitted through the stub optical fiber is coupled into the field optical fiber. Light energy that is not transmitted into the field optical fiber 15 results in a residual glow that is significantly less than the enhanced glow present when the end portion of the field optical fiber is spaced apart from the end portion of the stub optical fiber 14. In a particular embodiment, the mechanical splice connector 10 is a UNICAM® SC style field-installable connector of the type available from Corning Cable Systems LLC of Hickory, N.C. The light energy is introduced into the termination area of the mechanical splice connector 10 from the VFL 40 through the stub optical fiber 14. While the light energy from the VFL 40 is typically a visible wavelength light, the VFL may produce light energy having any wavelength, including invisible wavelength light, because as will be described further, the light energy from the VFL is delivered to an opto-electronic circuit having means for collecting the light energy and converting the optical power to an electrical power that is delivered to a feedback monitor defining a display indicative of the amount of light energy emanating from the termination area. In short, the apparatus and methods of the invention provide an electronic gauge and a method of electronically gauging the optical power at the termination area. In contrast, the use of the conventional CTS including a VFL relies on an operator to observe and subjectively interpret the amount of visible wavelength light emanating from the termination area. Accordingly, the results obtained using a conventional CTS are subject to considerable variability and inconsistency depending on a number of factors, including variations in the ambient light, variations in the translucence of different fiber optic connectors, the condition of the VFL and the adapter, the subjectivity of the operator, and the variability introduced by different operators conducting the test for different splice terminations under different test conditions.

The exemplary embodiment of the apparatus for verifying an acceptable splice termination shown in FIG. 2 comprises the installation tool 30, the VFL 40, a means 50 for collecting the optical energy propagated by the VFL and emanating from the termination area of the mechanical splice connector 10, and a feedback monitor 52 for displaying an indication of the amount of optical power emanating from the termination area. Although the terms "display(s)" and "displaying" are used throughout this written specification and in the appended claims, it is contemplated that the feedback monitor 52 may provide a visual, audio, or any other sensory (for example vibratory) indication to the operator of the amount of optical power emanating from the termination area so that the apparatus may be utilized in any conceivable work environment. Examples of a suitable feedback monitor 52 include, but are not limited to, a series of Light Emitting Diodes (LEDs), a Liquid Crystal Display (LCD) bar graph, an analog gauge, a mechanical needle or similar pointer, an electrical meter, an electrical scale, an audible signaling device, and any other device for providing a perceptible signal proportional to the amount of optical power emanating from the termination area of a fiber optic connector that is not generated or determined by the subjective interpretation of the operator. Merely for purposes of explanation and convenience, the feedback monitor 52 will be described herein as displaying a visual indication of the amount of optical power emanating from the termination area. In the preferred embodiments shown herein, the feedback monitor 52 comprises an optical power meter (see FIG. 2) or an LCD bar graph (see FIGS. 3A and 3B) operable for quantifying the amount of optical power collected from the termination area, and in particular the mechanical splice joint, and then displaying an actual or scaled optical power level useful for estimating the insertion loss so that the operator can determine whether the splice termination is acceptable. In other words, the collecting means 50 samples light energy emanating from the termination area, converts the optical power to electrical power, and delivers the electrical power to the feedback monitor 52, for example via an electrical cable 51 operably connected to and extending between the collecting means and the feedback monitor. The feedback monitor 52 then visually displays an optical power level or reading proportional to the electrical power delivered to the feedback monitor. The operator then reads the optical power level directly from the feedback monitor 52 to determine whether the splice termination is acceptable.

With regard to the specific apparatus shown in FIG. 2, the fiber optic mechanical splice connector 10 is mounted within a holder, commonly referred to as a cradle, provided on the tool housing 34 of the installation tool 30. The mechanical splice connector 10 is positioned on the tool housing 34 such that the cam member 20 is received within a cam actuator comprising a suitable means, such as a lever, or arm, 36 for actuating the cam member 20 at the appropriate time to secure the stub optical fiber 14 and the field optical fiber 15 between the splice components 17, 18. The dust cap (if provided) on the forward end 11 of the ferrule 12 is then removed and the mechanical splice connector 10 is disposed within one end of the adapter 35. For example, the cradle may be configured to slide longitudinally on the tool housing 34 in a direction generally parallel to the longitudinal bore of the ferrule 12. The test connector 44 is next disposed and properly seated within the other end of the adapter 35. Typically, the polished end face of the test connector 44 is in actual physical contact with the polished end face 11 of the mechanical splice connector 10 to establish good optical continuity between the test optical fiber 42 and the stub optical fiber 14. However, depending on the configuration of the adapter 35, the end faces of the mating connectors 44, 10 need not be in actual physical contact. Once the mechanical splice connector 10 and the test connector 44 are properly seated within the adapter 35, the VFL 40 is activated to propagate the light energy along the test optical fiber 42, through the test connector 44 and along the stub optical fiber 14 of the mechanical splice connector 10 to the termination area. As previously described, the light energy will produce a significant amount of "glow" at the termination area because the field optical fiber 15 is not yet in physical contact with the stub optical fiber 14. As a result, the light energy transmitted along the stub optical fiber 14 is not being coupled into the field optical fiber 15. Alternatively, the field optical fiber 15 may be at least partially inserted into the rear end of the connector (and more specifically into the rear end of the ferrule holder 16 and loosely between the splice components 17, 18) such that the end portion of the field optical fiber 15 is not yet in physical contact with the end portion of the stub optical fiber 14 before the VFL 40 is activated. In this manner, any possible concern that the laser light will propagate unabated through the splice connector 10 is avoided. For the same reason, the test connector 44 may be disposed within the adapter 35 after the field optical fiber 15 is partially inserted into the mechanical splice connector 10. However, typically the test connector 44 is disposed within the adapter 35 and the VFL 40 is activated before the field optical fiber 15 is inserted to provide the largest possible value of the insertion loss for use as a reference value in the un-terminated configuration, as will be described.

The collecting means 50 is positioned proximate and, more specifically, immediately adjacent the termination area of the mechanical splice connector 10 in order to collect a sufficient amount of the light energy at the termination area. The collecting means 50 may be any photo-sensitive device, such as a photodetector, photo-transistor, photo-resistor, optical integrator (e.g., integrating sphere), or the like. An alternative embodiment of the collecting means 50 includes one or more fiber optic strands positioned adjacent the termination area of the fiber optic connector 10. In the event that fiber optic connector 10 is a mechanical splice connector, the fiber optic strands may be positioned around the mechanical splice joint point in any arrangement capable of effectively collecting a sample of the light energy emanating from the mechanical splice. For example, the fiber optic strands may consist of two points, four points, or any number of points preferably arranged in a circular array about the mechanical splice joint. Preferably, the one or more fiber optic strands are large core multimode fibers, such as plastic optical fibers (POF), that are coupled together through a passive 1×N optical coupler into a single optical fiber that is in optical communication with the feedback monitor 52 (e.g., an optical power meter). Alternatively, the one or more fiber optic strands may be coupled into a large area detector, or the detector may be positioned about the splice joint and directly coupled to the feedback monitor 52 through an optical link. In additional embodiments, one or more lenses may be used to collect and focus the light energy emanating from the termination area into the fiber optic strands. In yet another embodiment, an optical integrating sphere may be used to collect a greater portion of the light energy. The light collected by the integrating sphere may be focused into one or more fiber optic strands operable for optically coupling the integrating sphere to an optical detector or optical power meter. Regardless, the collecting means 50 detects the amount of glow emanating from the termination area and collects the light energy, preferably in the form of optical power. The collecting means 50 converts the collected optical power to electrical power utilizing a conventional opto-electronic circuit and delivers an electrical signal that is proportional to the amount of collected optical power to the feedback monitor 52. As shown in FIG. 2, the feedback monitor 52 is operably connected to the collecting means 50 by an electrical cable 51. Accordingly, the collecting means 50 is typically configured with the opto-electronic circuit. Alternatively, the feedback monitor 52 may be operably connected to the collecting means 50 by an optical cable 51 and the feedback monitor configured with the opto-electronic circuit. Many other devices and methods for collecting the amount of light energy emanating from the termination area and displaying the magnitude of an electrical signal representative thereof on a monitoring device are well within the ordinary skill of the art and are intended to be included within the broad scope of the invention. Therefore, the scope of the invention should not be construed as being limited by the particular examples of the collecting means 50 and the feedback monitor 52, or their respective methods of operation shown and described herein.

The amount of glow emanating from the termination area and measured by the collecting means 50 before the field optical fiber 15 is inserted into the mechanical splice connector 10 is used as an "initial" (i.e., "reference") value representative of an "un-terminated" condition of the connector or, more specifically, an "un-actuated" condition of the cam member 20. The end portion of the field optical fiber 15 is then inserted and advanced into the mechanical splice connector 10 until it makes actual physical contact with the end portion of the stub optical fiber 14. If desired, the field optical fiber 15 may be pre-loaded with an axial stress by rotating an opposing pair of clamping rollers 38 provided on the tool base 32 with the field optical fiber disposed therebetween to ensure that the end portion of the field optical fiber remains in physical contact with the end portion of the stub optical fiber 14. The cam member 20 is then actuated to secure the relative positions of the field optical fiber 15 and the stub optical fiber 14 between the splice components 17, 18. If turned off after obtaining the initial (i.e., reference) value, the VFL 40 is activated once again to propagate the light energy to the termination area where the collecting means 50 detects the light energy and collects the optical power, converts the optical power to electrical power and delivers an electrical signal proportional to the optical power emanating from the termination area to the feedback monitor 52, as previously described. This subsequent measurement of the amount of glow emanating from the termination area, referred to herein as the "final" (i.e., "terminated") value, is then compared to the initial value to determine whether the splice termination is acceptable. In particular, it is the magnitude of the change (i.e., difference) between the initial value and the final value that is most indicative of an acceptable splice termination. For example, the sensitivity or scale of the optical power meter 52 in FIG. 2 may be adjusted so that the initial value of the optical power emanating from the termination area is represented by a needle or pointer that is positioned on the optical power meter at or beyond (to the right of) the location shown. If the needle or pointer is located at a position significantly to below (to the left of) the location representing the initial value once the field optical fiber 15 is aligned with and in physical contact with the stub optical fiber 14 (i.e., the final value of the optical power noticeably decreases), the operator may properly determine that the splice termination is acceptable. In this manner, the operator in most instances can rapidly, efficiently and accurately verify an acceptable splice termination without relying on a subjective interpretation of the difference in the amount of glow emanating from the termination area. It should be noted that the apparatus and methods can also be utilized with only minor variation to determine whether a splice termination is acceptable before the cam member 20 is actuated. In this alternative method, the sensitivity or scale of the optical power meter 52 is increased and the final value of the collected optical power is recorded once the field optical fiber 15 is advanced into the mechanical splice connector and in physical contact with the stub optical fiber 14. The final value of the collected optical power is then compared to the initial value. As long as the final value is relatively low and the initial value is significantly greater than the final value, the operator can presume that the splice termination is acceptable. This alternative method may be advantageous as a means for increasing productivity when many field optical fibers 15 are being successively terminated to the same type of mechanical splice connector 10 using the same test equipment (VFL 40, test optical fiber 42, test connector 44 and adapter 35) under the same test conditions. In still another alternative method, the feedback monitor 52 may consist of only a single green LED and a single red LED. If the final value is less than or equal to a predetermined limit or threshold, then the green LED is illuminated to indicate an acceptable splice termination. Otherwise, the red LED is illuminated to indicate an unacceptable splice termination. In this manner, all subjectivity of the operator is eliminated and the determination of an acceptable splice is reduced to a simple "go" or "no-go" decision based on the illuminated LED. Obviously, a single LED capable of illuminating more than one color, more than one intensity, or only illuminating in the event of an acceptable splice termination may be utilized.

Figure 3A:
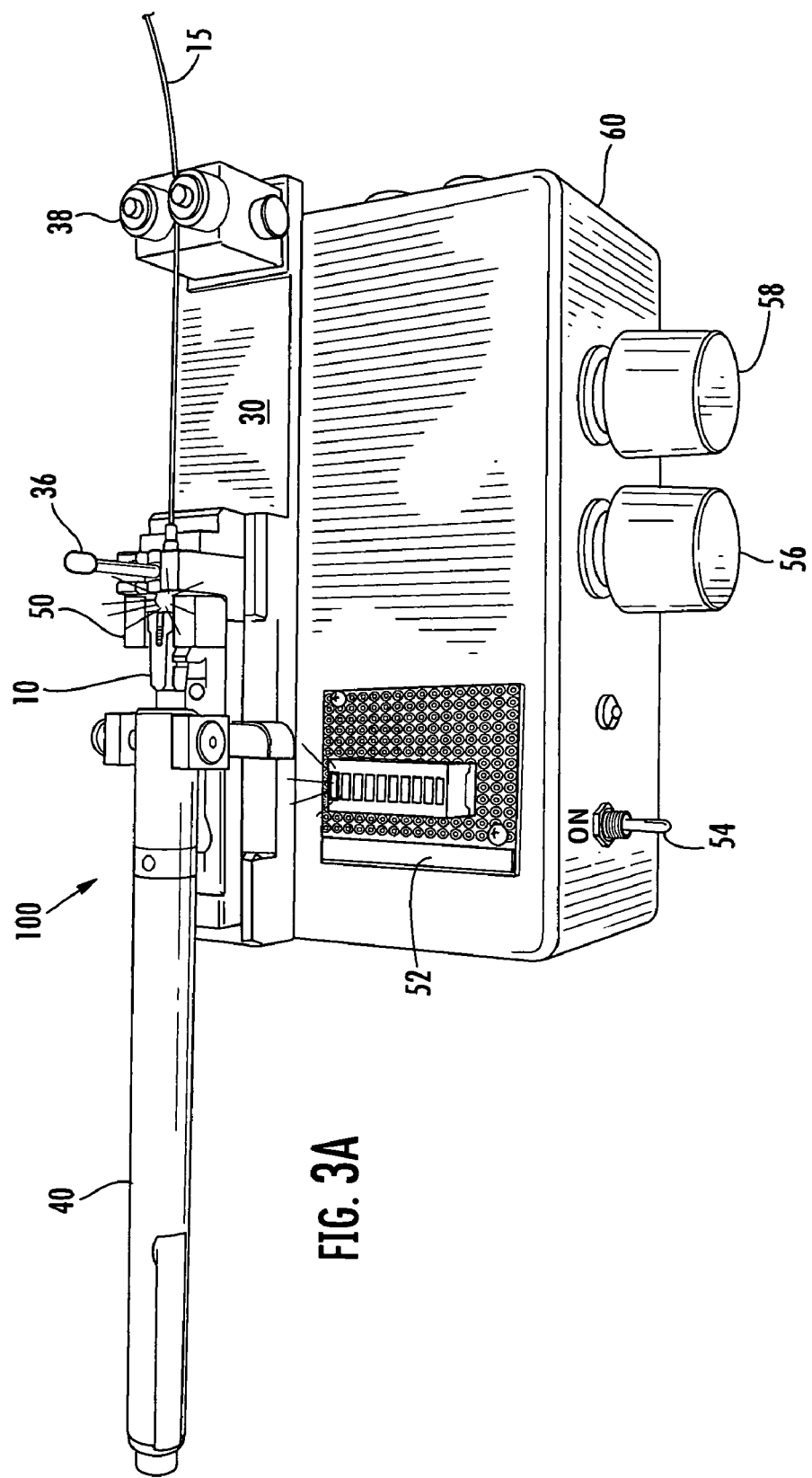
FIG. 3A is an environmental perspective view of an installation tool for a field-installable mechanical splice connector in accordance with another preferred apparatus and method of the invention, shown with the cam member in the un-actuated position.
Figure 3B:
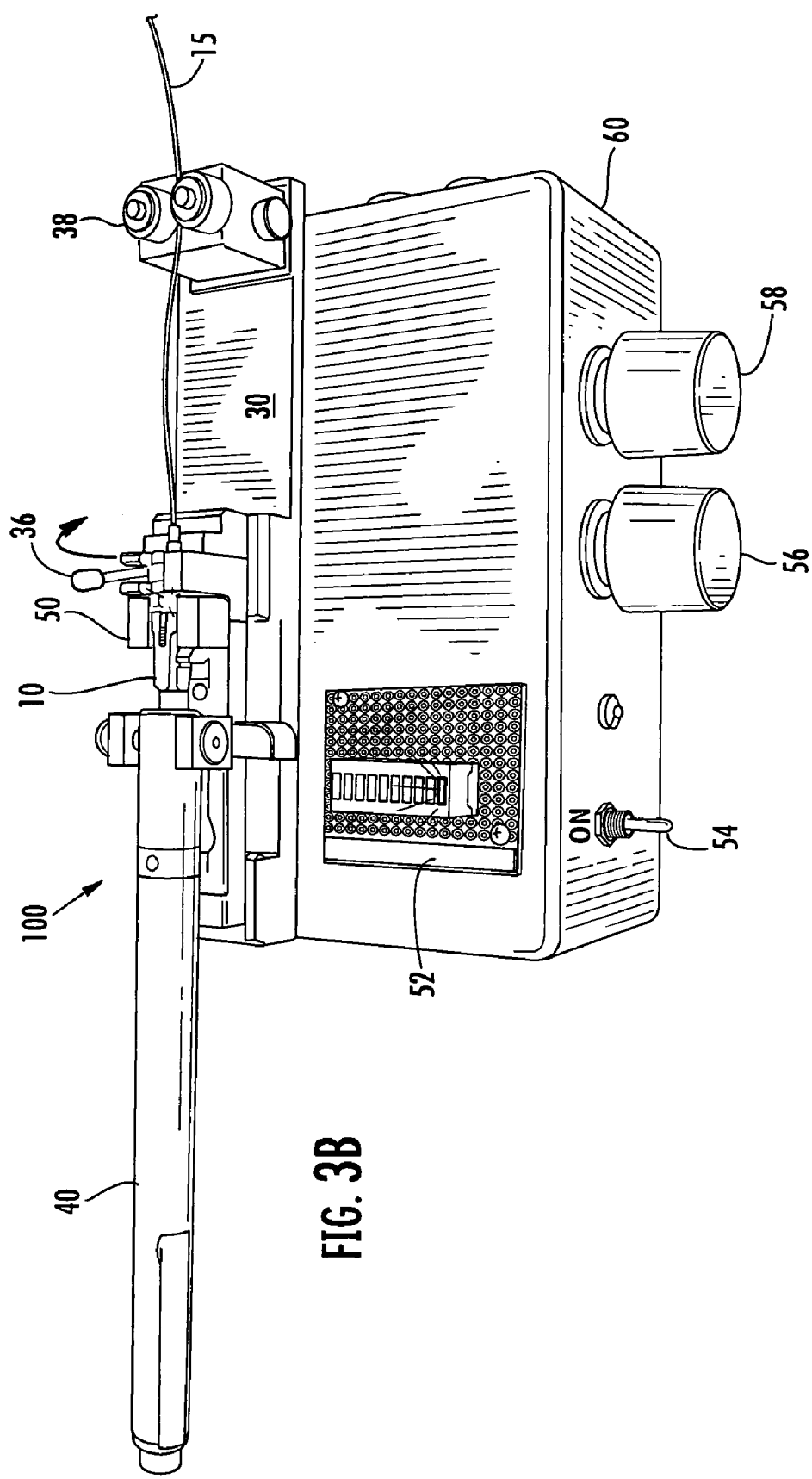
FIG. 3B is an environmental perspective view of the installation tool of FIG. 3A, shown with the cam member in the actuated position.

FIGS. 3A and 3B illustrate another preferred embodiment of an apparatus and method for verifying an acceptable splice termination in accordance with the invention. In this embodiment, the installation tool 30, the VFL 40 and the feedback monitor 52 have been combined into a single housing 60 to form an integrated installation tool and CTS 100, thereby eliminating the need for the test optical fiber 42, the test connector 44, the adapter 35 and the electrical or optical cable 51, as well as the potential for associated cabling problems and/or failures. As a result, the integrated installation tool and CTS 100 provides a space-saving, more efficient and more reliable jumper-less installation and test equipment system for field-installable fiber optic connectors. As shown, the installation tool 30 is configured for use with field-installable mechanical splice connectors. However, it is contemplated that the installation tool 30 can be easily modified to be configured for use with field-installable fusion splice connectors. The operation of the installation tool 30 is essentially as previously described with the exception that the fiber optic connector 10 need not be disposed within the adapter 35. Instead, the VFL 40 may be positioned on the housing 60 such that the ferrule 12 of the fiber optic connector 10 can be aligned with and brought into physical contact with the optical transmission element (e.g., optical fiber or laser diode) of the VFL 40. As a result, the optical connection between the VFL 40 and the fiber optic connector 10 does not require a jumper cable, such as test optical fiber 42. Furthermore, suitable structural components may be provided between the VFL 40 and the ferrule 12 of the fiber optic connector 10 such that the ferrule need not be in actual physical contact with the optical transmission element of the VFL, thereby reducing the possibility of damage to the end face 11 of the ferrule, the stub optical fiber 14 or the optical transmission element, as well as increasing the useful life of the VFL. The housing 60 may also be provided with an activation device, such as a switch, 54 for activating the VFL 40 to propagate light energy into the stub optical fiber 14 of the fiber optic connector 10 at the appropriate time. Typically, the switch 54 will likewise activate the feedback monitor 52 to display a visual indication of the amount of optical power collected at the termination area by the collecting means 50. However, a second activation device may be provided on the housing 60 to separately activate the feedback monitor 52. In addition, one or more attenuators, such as dials or knobs, 56, 58 may be provided on the housing 60 for adjusting the sensitivity or scale of the feedback monitor 52 and/or the collecting means 50.

The feedback monitor 52 is illustrated as an LCD bar graph in the embodiment shown in FIGS. 3A and 3B. In particular, the LCD bar graph 52 comprises a series of indicators that may be individually or collectively illuminated to represent the amount of optical power at the termination area detected and collected by the collecting means 50. As shown in FIG. 2A, the end portion of the field optical fiber 15 is partially inserted into the rear end of the mechanical splice connector 10, but is not yet in physical contact with the stub optical fiber 14. As a result, a significant amount of glow is shown emanating from the termination area (as indicated by the enhanced light pattern adjacent the collecting means 50) and the LCD bar graph 52 is shown displaying a significant amount of optical power detected and collected by the collecting means (as indicated by the uppermost indicator of the bar graph being illuminated). Preferably, the sensitivity of the collecting means 50 or the scale of the LCD bar graph 52 is adjusted such that the uppermost indicator being illuminated corresponds to the initial value of the collected optical power. It should be noted that the cam actuator arm 36 provided on the installation tool 30 to actuate the cam member 20 is in the vertical un-actuated position and there is no pre-load on the field optical fiber 15. However, as previously described, the initial value of the collected optical power is typically displayed on the bar graph 52 with the cam actuator arm 36 in the vertical un-actuated position and before the field optical fiber 15 is inserted into the mechanical splice connector 10.

As shown in FIG. 3B, the end portion of the field optical fiber 15 is in physical contact with the stub optical fiber 14 and a pre-load is applied to the field optical fiber. Furthermore, the cam actuator arm 36 is shown in the horizontal actuated position rotated about ninety degrees (90°) clockwise from the vertical un-actuated position shown in FIG. 3A. As a result, a substantially reduced amount of glow is shown emanating from the termination area (as indicated by the reduced light pattern adjacent the collecting means 50) and the LCD bar graph 52 is shown displaying a substantially reduced amount of optical power detected and collected by the collecting means (as indicated by the lowermost indicator of the bar graph being illuminated). The lowermost indicator on the LCD bar graph 52 being illuminated corresponds to the final value of the collected optical power. Accordingly, an operator can readily determine whether the change (i.e., difference) between the initial value of the collected optical power and the final value of the collected optical power is significant enough to verify an acceptable splice termination. As shown, the cam actuator arm 36 provided on the installation tool 30 is rotated about ninety degrees (90°) clockwise around the longitudinal axis of the fiber optic connector 10 so that the cam member 20 is in the actuated position and the field optical fiber 15 is terminated to the connector. However, as previously described, the initial value of the collected optical power alternatively may be displayed on the LCD bar graph 52 with the cam actuator arm 36 in the vertical un-actuated position and the field optical fiber 15 in physical contact with the stub optical fiber 14, and with or without a pre-load applied to the field optical fiber.

Figure 4:
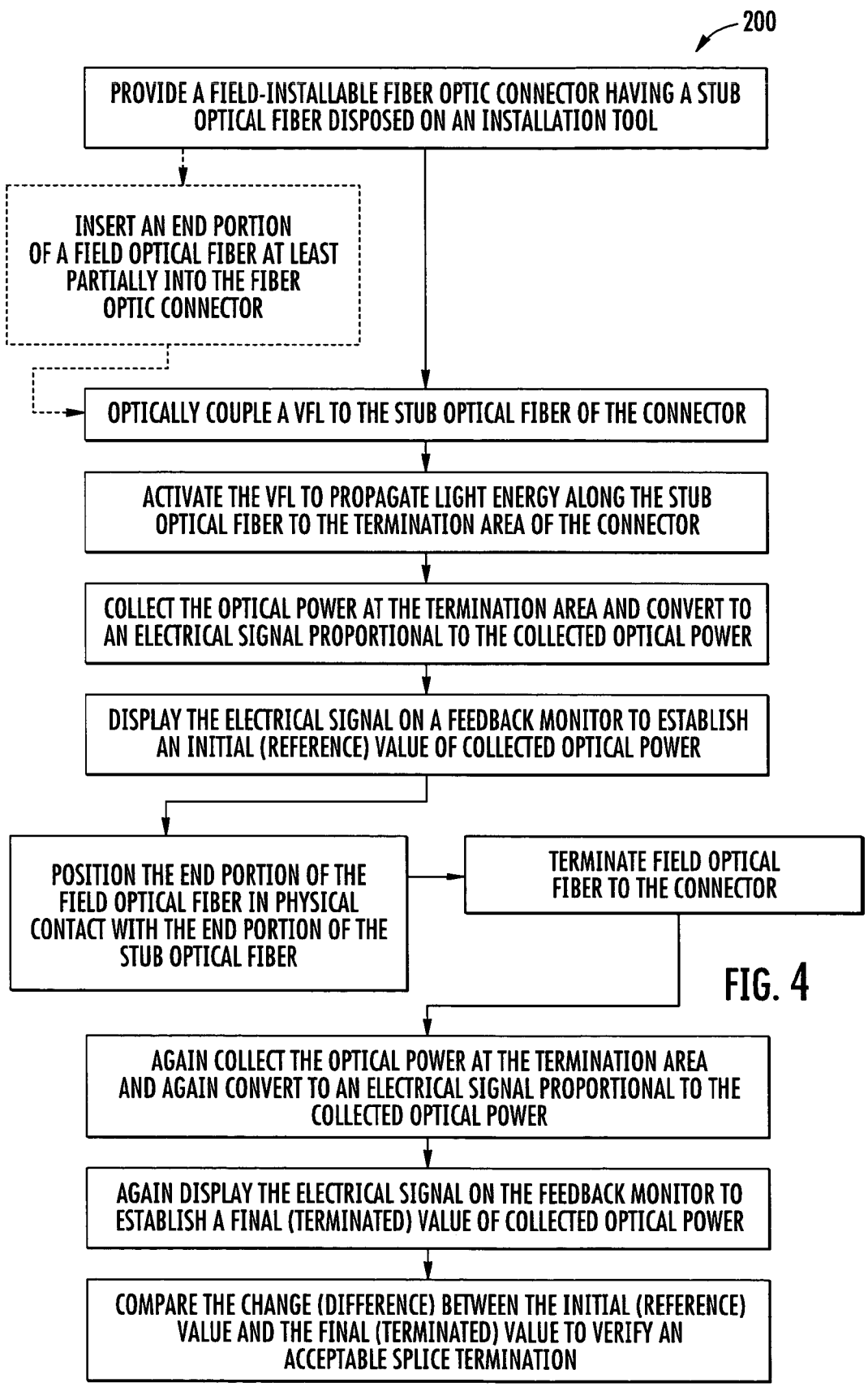
FIG. 4 is a flow chart illustrating preferred methods for verifying an acceptable splice termination in accordance with the invention.

FIG. 4 is a flowchart illustrating preferred embodiments of methods 200 for verifying an acceptable splice termination according to the invention previously described. In the broad sense of the invention, a field-installable fiber optic connector having a stub optical fiber extending rearwardly from a ferrule is provided and disposed on an installation tool. An optical transmission element of an optical power generator, such as a VFL, is optically coupled to the polished end face of the ferrule such that light energy propagated by the VFL is transmitted along the stub optical fiber to a termination area of the fiber optic connector. The VFL is activated and the amount of light energy emanating from the termination area in the form of optical power is collected and converted to electrical power in the form of an electrical signal that is proportional to the collected optical power. The electrical signal representing the collected optical power is displayed on a feedback monitor to establish an initial value of the collected optical power. The end portion of a field optical fiber is inserted and advanced into the rear end of the fiber optic connector until the end portion of the field optical fiber is in physical contact with the end portion of the stub optical fiber. The field optical fiber is then terminated to the fiber optic connector by actuating the cam member. If the VFL was turned off after the initial value was displayed, the VFL is again activated. The amount of light energy emanating from the termination area in the form of optical power is again collected and again converted to electrical power in the form of an electrical signal that is proportional to the collected optical power. The electrical signal representing the collected optical power is displayed on a feedback monitor to establish a final value of the collected optical power. An operator compares the change (i.e., difference) between the initial value of the collected optical power and the final value of the collected optical power to verify whether the splice termination is acceptable. Alternatively, the initial value may be obtained with the end portion of the field optical fiber in physical contact with the end portion of the stub optical fiber, but not yet terminated. The field optical fiber is then terminated to the fiber optic connector and the final value is obtained. The final value is then compared to the initial value to determine whether the splice termination is acceptable in the manner previously described. Alternatively, the final value may be compared to a predetermined limit or threshold to determine whether the splice termination is acceptable.

The UNICAM® family of fiber optic mechanical splice connectors is ideal for applying the apparatus and methods of the present invention to estimate the insertion loss at the mechanical splice joint between the stub optical fiber 14 and the field optical fiber 15, and thereby determine whether the splice termination is acceptable. The UNICAM® mechanical splice connector technology has unique design features that enable a rapid, accurate and cost effective estimation of the insertion loss of the mechanical splice joint during the termination process and prior to strain relieving the coating or buffer 25 surrounding the field optical fiber 15. As stated above, the means for collecting light is used to display an initial (i.e., reference) optical power and a final (i.e., terminated) optical power. An estimate of the insertion loss can be calculated based on a percentage of the final optical power to the initial optical power as described in co-pending U.S. patent application Ser. No. 11/193,931 filed on Jul. 29, 2005, and assigned to the assignee of the present invention. This estimate of the insertion loss reduces UNICAM® scrap rates by further eliminating reliance on the subjectivity of an operator to determine visually whether there has been a sufficient reduction in the amount of "glow" emanating from the mechanical splice joint to verify acceptable optical continuity between the stub optical fiber 14 and the field optical fiber 15.

It will be apparent to those skilled in the art that innumerable modifications and variations can be made to the exemplary embodiments of the apparatus and methods of the invention shown and described herein without departing from the spirit and scope of the invention. Thus, it is intended that the present invention cover all conceivable modifications and variations of this invention, provided those alternative embodiments fall within the scope of the appended claims and their equivalents.

That which is claimed is:

1. An apparatus for verifying an acceptable splice termination comprising:
    a fiber optic connector having a stub optical fiber;
    a field optical fiber having an end portion for being inserted into the fiber optic connector;
    an installation tool operable for terminating the field optical fiber to the fiber optic connector;
    an optical power generator in optical communication with one of the field optical fiber and the stub optical fiber for propagating light energy along the field optical fiber or the stub optical fiber to a termination area of the fiber optic connector;
    means for collecting the light energy at the termination area; and
    a feedback monitor for indicating the amount of light energy collected at the termination area and displaying when an acceptable splice termination is performed, wherein the feedback monitor includes a first light emitting device indicating an acceptable splice termination and a second light emitting device indicating an unacceptable splice termination.

2. The apparatus of claim 1 wherein the optical power generator comprises a Visual Fault Locator having a laser for generating a laser light.

3. The apparatus of claim 2 wherein the Visual Fault Locator comprises a test optical fiber having a first end in optical communication with the laser and a second having a test connector mounted thereon.

4. The apparatus of claim 3 further comprising an adapter disposed on the installation tool for optically interconnecting the test connector and the fiber optic connector.

5. The apparatus of claim 1 wherein the means for collecting is selected from the group consisting of a photodetector, a photo-transistor, a photo-resistor, an optical integrator and one or more fiber optic strands.

6. The apparatus of claim 1 wherein the fiber optic connector is a mechanical splice connector comprising a cam member and the installation tool comprises a cam actuator arm operable for actuating the cam member to terminate the field optical fiber to the fiber optic connector.

7. The apparatus of claim 6 wherein the mechanical splice connector further comprises a pair of opposing splice components and the cam member is operable for securing the field optical fiber relative to the stub optical fiber between the splice components.

8. An apparatus for verifying an acceptable splice termination between a field optical fiber and a fiber optic mechanical splice connector having a stub fiber, the apparatus comprising:
    an installation tool operable for terminating the field optical fiber to the mechanical splice connector;
    an optical power generator for generating and propagating light energy along one of the field optical fiber and the stub optical fiber to a termination area of the mechanical splice connector;
    means for collecting the light energy at the termination area; and
    a feedback monitor for indicating the amount of light energy collected at the termination area and displaying when an acceptable splice termination is performed, wherein the feedback monitor includes a first light emitting device indicating an acceptable splice termination and a second light emitting device indicating an unacceptable splice termination.

9. The apparatus of claim 8 wherein the optical power generator comprises a Visual Fault Locator having a laser for generating a laser light.

10. The apparatus of claim 8 wherein the means for collecting is selected from the group consisting of a photodetector, a photo-transistor, a photo-resistor, an optical integrator and one or more fiber optic strands.

11. The apparatus of claim 8 wherein the mechanical splice connector comprises a cam member and the installation tool comprises a cam actuator arm operable for actuating the cam member to terminate the field optical fiber to the fiber optic connector.

12. The apparatus of claim 11 wherein the mechanical splice connector further comprises a pair of opposing splice components and the cam member is operable for securing the field optical fiber relative to the stub optical fiber between the splice components.

13. An apparatus for verifying an acceptable splice termination between a first optical fiber and a second optical fiber, the apparatus comprising:
- an installation tool operable for terminating the first optical fiber with the second optical fiber;
- an optical power generator for generating and propagating light energy along one of the first optical fiber and the second optical fiber to a termination area;
- a photodetector for collecting the light energy at the termination area; and
- a feedback monitor for indicating the amount of light energy collected at the termination area and displaying when an acceptable splice termination is performed, wherein the feedback monitor includes a first light emitting device indicating an acceptable splice termination and a second light emitting device indicating an unacceptable splice termination.

14. The apparatus of claim 13 wherein the optical power generator comprises a Visual Fault Locator having a laser for generating a laser light.

15. The apparatus of claim 13 wherein the installation tool receives a mechanical splice connector and includes a cam actuator arm operable for actuating the cam member of the mechanical splice connector to terminate the first optical fiber and the second optical fiber.

16. The apparatus of claim 15 wherein the mechanical splice connector further comprises a pair of opposing splice components and the cam member is operable for securing the first optical fiber relative to the second optical fiber between the splice components.

* * * * *